(12) United States Patent
Kwon et al.

(10) Patent No.: US 9,653,218 B2
(45) Date of Patent: May 16, 2017

(54) ELECTROLYTIC SOLUTION FOR ELECTRIC DOUBLE-LAYER CAPACITOR, AND ELECTRIC DOUBLE-LAYER CAPACITOR

(71) Applicants: IDEA INTERNATIONAL INC., Fukuoka (JP); TOHOKU-UNIVERSITY, Miyagi (JP)

(72) Inventors: Eunsang Kwon, Miyagi (JP); Yasuhiko Kasama, Miyagi (JP); Kazuhiko Kawachi, Miyagi (JP); Kenichiro Komatsu, Miyagi (JP)

(73) Assignees: IDEA INTERNATIONAL INC., Miyagi (JP); TOHOKU UNIVERSITY, Miyagi (JP)

( * ) Notice: Subject to any disclaimer, the term of this patent is extended or adjusted under 35 U.S.C. 154(b) by 57 days.

(21) Appl. No.: 14/410,253

(22) PCT Filed: Jun. 24, 2013

(86) PCT No.: PCT/JP2013/067289
§ 371 (c)(1),
(2) Date: Dec. 22, 2014

(87) PCT Pub. No.: WO2013/191297
PCT Pub. Date: Dec. 27, 2013

(65) Prior Publication Data
US 2015/0340168 A1 Nov. 26, 2015

(30) Foreign Application Priority Data
Jun. 22, 2012 (JP) .................................. 2012-141439

(51) Int. Cl.
*H01G 11/54* (2013.01)
*H01G 11/04* (2013.01)
(Continued)

(52) U.S. Cl.
CPC ............. *H01G 11/04* (2013.01); *H01G 11/24* (2013.01); *H01G 11/30* (2013.01); *H01G 11/54* (2013.01);
(Continued)

(58) Field of Classification Search
CPC ........ H01G 11/56; H01G 11/64; H01G 11/62; H01G 11/30; H01G 11/24
See application file for complete search history.

(56) References Cited

U.S. PATENT DOCUMENTS

| | | | |
|---|---|---|---|
| 5,223,353 A | 6/1993 | Ohsawa et al. | |
| 7,646,588 B2* | 1/2010 | Miyahara | B82Y 30/00 361/502 |
| 2007/0145352 A1* | 6/2007 | Kasama | B82Y 30/00 257/40 |

FOREIGN PATENT DOCUMENTS

| | | |
|---|---|---|
| JP | 2002-037615 | 2/2002 |
| JP | 2006-073201 | 3/2006 |

(Continued)

OTHER PUBLICATIONS

Abstract for CN 102760574, Oct. 31, 2012.*
International Search Report—PCT/JP2013/067289—Sep. 17, 2013.
Japanese Official Action—2012-141439—Mar. 10, 2017.

*Primary Examiner* — Carol M Koslow
(74) *Attorney, Agent, or Firm* — Young & Thompson (57) ABSTRACT

An electric double-layer capacitor is provided which is larger in electrostatic capacitance, and can be much higher in rated voltage, than that in the prior art using a liquid electrolyte solely composed of an ionic liquid. Having an electrolyte and electrodes, the capacitor incorporates an atom encapsulated fullerene or an atom encapsulated fullerene salt in the electrolyte. The electrolyte can either be a liquid solution or a solid. With the electrolyte being a solid, cations of the atom encapsulated fullerene or atom encap- (Continued)

Charging

Discharging sulated fullerene salt may either be made movable or static in the electrolyte.

1 Claim, 5 Drawing Sheets

(51) Int. Cl.
*H01G 11/64* (2013.01)
*H01G 11/30* (2013.01)
*H01G 11/24* (2013.01)
*H01G 11/56* (2013.01)
*H01G 11/62* (2013.01)

(52) U.S. Cl.
CPC ............. *H01G 11/56* (2013.01); *H01G 11/62* (2013.01); *H01G 11/64* (2013.01); *Y02E 60/13* (2013.01)

(56) References Cited

FOREIGN PATENT DOCUMENTS

| | | |
|---|---|---|
| JP | 2006-196464 | 7/2006 |
| JP | 2007-221008 | 8/2007 |
| JP | 2009-119409 | 6/2009 |
| JP | 2011-073887 | 4/2011 |
| JP | 2011-178723 | 9/2011 |
| WO | 2005/049538 | 6/2005 |

* cited by examiner

ELECTROLYTIC SOLUTION FOR ELECTRIC DOUBLE-LAYER CAPACITOR, AND ELECTRIC DOUBLE-LAYER CAPACITOR

BACKGROUND OF THE INVENTION

Field of the Invention

The present invention relates to a liquid electrolyte for electric double-layer capacitors and to an electric double-layer capacitor.

Description of the Related Art

An electric double-layer capacitor is a capacitor in which an electric double layer that appears at the interface between a conductive electrode and a liquid electrolyte is constituted as a dielectric for storing electric charge thereon.

An electric double-layer capacitor unlike a lithium rechargeable battery entails no chemical reaction in storage of charge. This allows the electric double-layer capacitor to charge and discharge rapidly and its cycle life to be long, making it suitable for use in a power-assisting and an energy-regenerating device which requires an instantaneously increased electric current.

An electric double-layer capacitor in the prior art has problems, however.

The first problem is that it has a relatively low electrostatic capacitance. In order to increase the electrostatic capacitance, improvements have been made by contriving to achieve an increased specific surface area of an electrode material to acquire an electrostatic capacitance as of a lithium ion rechargeable battery.

It is, however, desirable to implement an electric double-layer capacitor which possesses a further increased electrostatic capacitance.

The second problem is that a conventional electric double-layer capacitor has a low dielectric strength or withstanding voltage such that the voltage to which it can be charged may at the maximum be up to 3 volts or so. While enhancing the storage energy of a capacitor is thought to include raising the voltage that can be applied, applying a voltage as high as, say, 3 volts, to an electric double-layer capacitor using a liquid electrolyte having an electrolyte dissolved in an organic solvent comes to deteriorate its durability and the like.

An ionic liquid that is a salt which exhibits a liquid phase in the vicinity of room temperature and which is nonvolatile, noncombustible, thermally stable, ion-conductive and resistant to electrolysis, is better in resistance to oxidation than a usual organic solvent. Thus, using an ionic liquid as a liquid electrolyte than using a liquid electrolyte having an electrolyte dissolved in a usual organic solvent can be expected to improve the durability of a capacitor under the condition that a high voltage of around 3 volts is applied thereto (See, for example, Patent Document 1 infra).

However, for an electric double-layer capacitor using an ionic liquid as its liquid electrolyte it is desired to have a larger electrostatic capacitance as well. Also, its durability under higher applied voltage conditions of exceeding 3 volts is insufficient, requiring further improvements.

As a system improving a condition of voltage application, it should in passing be noted that a lithium ion capacitor using lithium ions has been adopted. However, the problems arises that applying a voltages of 4 volts or more causes metal lithium to be deposited.

As regards a fullerene, processes of its synthesis and isolation have illustratively been disclosed in Patent Documents 2 and 3 infra, respectively.

PRIOR ART REFERENCE

Patent References

Patent Document 1: JP 2005-353652 A
Patent Document 2: JP WO2005-066385 A1
Patent Document 3: JP 2011-084457 A

SUMMARY OF THE INVENTION

The invention according to one embodiment is an electric double-layer capacitor having an electrolyte and an electrode, wherein the capacitor incorporates an atom ion encapsulated fullerene or an atom ion encapsulated fullerene salt in the electrolyte.

The invention according to another embodiment is an electric double-layer capacitor as set forth in the first embodiment wherein the said electrolyte is had in the form of a liquid solution thereof.

The invention according to a third embodiment is an electric double-layer capacitor as set forth in the first embodiment wherein the said electrolyte is had in the form of a solid thereof.

The invention according to a fourth embodiment is an electric double-layer capacitor as set forth in the third embodiment wherein cations of the atom ion encapsulated fullerene or atom ion encapsulated fullerene salt are movable in the said electrolyte.

The invention according to a fifth embodiment is an electric double-layer capacitor as set forth in the third embodiment wherein cations of the atom ion encapsulated fullerene or atom ion encapsulated fullerene salt are static in the said electrolyte.

The invention according to a sixth embodiment is an electric double-layer capacitor as set forth in the fifth embodiment wherein the atom ion encapsulated fullerene is formed as a crystal.

The invention according to a seventh embodiment is an electric double-layer capacitor as set forth in any one of the first through sixth embodiments wherein the atom is of a metal.

The invention according to an eighth embodiment is an electric double-layer capacitor as set forth in the seventh embodiment wherein the said metal is an alkali metal.

The invention according to a ninth embodiment is an electric double-layer capacitor as set forth in any one of first through eighth embodiments wherein the fullerene is C60.

The invention according to a tenth embodiment is an electric double-layer capacitor as set forth in any one of first through eighth embodiments wherein counterpart ions of the atom ion encapsulated fullerene are ones selected from the class which consists of Cl—, Br—, F—, I—, ClO3-, ClO4-, BF4-, AlCl4-, PF6-, SbCl6- and SbF6-.

The invention according to an eleventh embodiment is an electric double-layer capacitor as set forth in the sixth embodiment wherein counterpart ions of the atom ion encapsulated fullerene are of a diameter smaller than a minimum distance across a spacing formed of the atom ion encapsulated fullerene that is crystallographic oriented.

The invention according to a twelfth embodiment is an electric double-layer capacitor as set forth in the second embodiment wherein said liquid solution is one of an ionic liquid or an organic solvent.

The invention according to a thirteenth embodiment is an electric double-layer capacitor as set forth in any one of first through ninth or twelfth embodiment wherein said atom ion encapsulated fullerene salt is Li@C60.PF6.

The invention according to a fourteenth embodiment is an electric double-layer capacitor as set forth in any one of first through thirteenth embodiment wherein the electrode is formed of a porous material.

The invention according to a fifteenth embodiment is an electric double-layer capacitor as set forth in any one of first through fourteenth embodiments wherein the electrode is formed of silver.

The invention according to a sixteenth embodiment is an electrolyte for an electric double-layer capacitor, wherein the electrolyte contains an atom ion encapsulated fullerene therein.

According to the present inventions, effects are achieved as stated infra.

In accordance with the present invention, an electrostatic capacitance is attained that is much larger than that of a conventional electric double-layer capacitor using an ionic liquid as the liquid electrolyte. As a result, an electric double-layer capacitor can be realized having a greater energy density.

An atom such as of a lithium ion as the electrolyte is chemically protected by a fullerene. So that it can be used under a high applied voltage, e.g., of 5 volts, the electric double-layer capacitor has an energy density higher than that of a lithium ion capacitor.

Regardless of which are of conventional lithium ion battery or electric double-layer capacitor concerned, cations (mainly of a metal) tend to come into direct contact with an electrode, ending to form a film on the electrode. This tendency is increased as the voltage applied is higher, so that even if use is made of an ionic liquid as the electrolyte, there is a limitation in the rated voltage. In the present invention, cations which are each protected in a fullerene cage are kept out of direct contact with the electrode not to react therewith, forming no film and, thus permitting the rated voltage from this respect as well to be raised than in the prior art.

Also, a raise of the applied voltage has hitherto caused cations to coagulate, this being conjectured to invite lowering of the rated voltage. In the present invention, cations (L+) held out of direct contact from each other and forming no such coagulation allows raising the rated voltage.

Lithium ions which are deemed the largest in charge of alkali metals are held completely independent from each other and in shells of the fullerene hindering solvation of lithium ions from the electrolyte, and are spherically symmetrical and are thus movable fast. A large power density can thus be realized.

DESCRIPTION OF THE PREFERRED EMBODIMENTS

Explanation is given hereafter of forms of implementation of the present invention.

In accordance with the present invention, an electric double-layer capacitor is prepared having an electrolyte in the form of a liquid solution incorporating an atom ion encapsulated fullerene therein.

Atom Ion Encapsulated Fullerene

Of an atom ion encapsulated fullerene, a fullerene is of a molecular structure of carbon which is a unique steric structure (cage structure) symmetrically configured like a succor or rugby ball having a diameter of about 0.7 to 1.0 nm. The fullerene has a free space accommodating or encapsulated with several in number of atoms inside of its cage. A fullerene containing or encapsulated with an atom or atoms in the free space is termed an atom ion encapsulated fullerene.

An atom embraced in a fullerene constituting an atom ion encapsulated fullerene is preferably of a metal and more preferably of an alkali metal. Specifically, for example, the alkali metal is selected from lithium, sodium, potassium, and cesium, and the metal is selected from magnesium, calcium and strontium, of which lithium is most preferred.

Fullerene may not only be of 60 carbon atoms but also be a higher fullerene comprising more than 60, such as 70 or 76, carbon atoms. An encapsulated fullerene of 60 carbon atoms is preferred which is the highest in spherical symmetry.

An atom ion encapsulated fullerene may be synthesized by an arc discharge process but should preferably be by a synthesizing method as described In Patent Document 2. To wit, a plasma forming means is used to generate a plasma containing injection ions and charged particles of a polarity opposite to that of the injection ions, from which is preferably synthesized an atom ion encapsulated fullerene by transporting the plasma onto a build-up substrate under the action of a magnetic field, applying a bias voltage to the build-up substrate to impart an accelerating energy to the injection ions and irradiating the plasma towards the build-up substrate to inject the injection ions into a film of material on the build-up substrate.

An atom ion encapsulated fullerene as synthesized by the synthesizing method described above may, for example, be prepared in the form of a salt thereof by a process as described in Patent Document 3. To wit, an atom ion encapsulated fullerene salt can be formed as a crystal by process steps as referred to as de-clustering, insoluble solid removal, precipitation forming, salt removal, vacant fullerene removal, extraction of atom ion encapsulated fullerene cations, solid deposition, solid recovery, crystallization, and crystal recovery.

In case an atom ion encapsulated fullerene is used in the form of a salt thereof, counterpart ions can, for example, include Cl—, Br—, F—, I—, ClO3-, ClO4-, AlCl4-, PF6-, Sbcl6- and SbF6-.

The counterpart ions are preferably ions having a diameter smaller than the size of a spacing formed between cations that are layered. For, e.g. a [Li@C60] salt, ions having an atomic radius of no more than 0.4 nm is preferred, preferably of Halogen family, especially of F.

It should be further noted that exchanging with counterpart ions may use a method known conventionally. For example, when it is desired to exchange [Li@C60][PF6-] with [Li@C60][F—], methods known in the prior art may be used as shown infra.

Other techniques include a method using an ion-exchange resin.

Dielectric Constant of Atom Ion Encapsulated fullerene Salt Measurement is made, using Equation 1, of dipole moment of an atom ion encapsulated fullerene.

Made is on [Li@C60][PF6] salt as an example. Note that as regards [Li@C60][PF6] salt, its structure such as of the position of Li+ in C60 has already be analyzed and published.

$$\mu = q \times r \quad \text{(Equation 1)}$$

(q: electric charge and r: distance between both charges)

where the dipole moment is assumed to be the vector of a force from a positive charge towards a negative charge with r being a distance between Li+ and [PF6]-.

Considering that there is a correlation between a size of the dipole moment and a size of the dielectric constant, the dielectric constant of an atom ion encapsulated fullerene is seen to be a value of five or six times as large as the dielectric constant of barium titanate.

Liquid Electrolyte

In the present invention, with an atom ion encapsulated fullerene which is incorporated in a liquid electrolyte, its solvent can include an ionic liquid, an organic solvent, or a mixture of the ionic liquid and organic solvent.

Ionic Liquid

An ionic liquid is a salt consisting of positive and negative ions and which is in liquid phase at room temperature.

Ionic liquids are largely classified into three: a pyridine family, an alicyclic amine family and aliphatic amine family. By selecting a kind of negative ions to be combined therewith, a variety of structures can be synthesized. Included as positive ions used are of an ammonium family including imidazolium salts and pyridinium salts, phosphonium ions and inorganic ions. And, included as negative ions adopted are, for example, of a halogen family including bromide ions and triflate ions, a boron family including tetraphenyl borate and phosphorus family including hexafluorophosphate.

Examples of the ionic liquid are listed in Table 1 infra.

TABLE 1

1-(2-Hydroxyethyl)-3-methylimidazolium tetrafluoroborate
1-(2-Methoxyethyl)-1-methylpyrrolidinium tris(pentafluoroethyl) trifluorophosphate
1-(3-Cyanopropyl)-3-methylimidazolium chloride purum
1-(3-Cyanopropyl)-3-methylimidazolium dicyanamide
1-(3-Cyanopropyl)-3-methylimidazolium bis(trifluoromethylsulfonyl)imide
1-(3-Cyanopropyl)pyridinium bis(trifluoromethylsulfonyl)imide
1-(3-Cyanopropyl)pyridinium chloride
1-(Cyanomethyl)-3-methylimidazolium chloride
1,2,3-Trimethylimidazolium chloride
1,2,3-Trimethylimidazolium methylsulfate
1,2,4-Trimethylpyrazolium methylsulfate
1,2-Dimethyl-3-propylimidazolium bis(trifluoromethylsulfonyl)-imide
1,2-Dimethyl-3-propylimidazolium tris(trifluoromethylsulfonyl)-methide
1,3-Bis(3-cyanopropyl)imidazolium bis(trifluoromethylsulfonyl)imide
1,3-Bis(3-cyanopropyl)imidazolium chloride
1,3-Bis(cyanomethyl)imidazolium bis(trifluoromethylsulfonyl)imide
1,3-Bis(cyanomethyl)imidazolium chloride TABLE 1-continued 1,3-Dibutylimidazolium chloride
1,3-Dibutylimidazolium tetrachloroaluminate
1,3-Dibutylimidazolium chloride
1,3-Dibutylimidazolium dimethylphosphate
1,3-Dibutylimidazolium hydrogen carbonate
1,3-Dibutylimidazolium iodide
1,3-Dibutylimidazolium tetrachloroaluminate
1,4-Dibutyl-3-phenylimidazolium bis[trifluoromethylsulfonyl]amide
1-Butyl-1-methylpyrrolidinium bis(trifluoromethylsulfonyl)imide
1-Butyl-1-methylpyrrolidinium methylcarbonate
1-Butyl-1-methylpyrrolidinium tetracyanoborate
1-Butyl-1-methylpyrrolidinium tris(pentafluoroethyl) trifluorophosphate
1-Butyl-2,3-dimethylimidazolium chloride
1-Butyl-2,3-dimethylimidazolium iodide
1-Butyl-2,3-dimethylimidazolium trifluoromethanesulfonate
1-Butyl-2,3-methylimidazolium bis(trifluoromethylsulfonyl)imide
1-Buty-3-methylimidazolium 2-(2methoxyethoxy) ethyl sulfate
1-Buty-3-methylimidazolium acetate
1-Buty-3-methylimidazolium bis(trifluoromethylsulfonyl)imide
1-Buty-3-methylimidazolium bromide
1-Buty-3-methylimidazolium chloride
1-Buty-3-methylimidazolium dibutylphophate
1-Buty-3-methylimidazolium dicyanamide
1-Buty-3-methylimidazolium heptachlorodialuminate
1-Buty-3-methylimidazolium hexafluorophosphate
1-Buty-3-methylimidazolium hydrogen carbonate
1-Buty-3-methylimidazolium hydrogen sulfate
1-Buty-3-methylimidazolium iodide
1-Buty-3-methylimidazolium methane sulfonate
1-Buty-3-methylimidazolium methyl sulfate
1-Buty-3-methylimidazolium methylsulfate
1-Buty-3-methylimidazolium nitrate
1-Buty-3-methylimidazolium octylsulfate
1-Buty-3-methylimidazolium tetrachloroaluminate
1-Buty-3-methylimidazolium tetrachloroferrate
1-Buty-3-methylimidazolium tetrafluoroborate
1-Buty-3-methylimidazolium thiocyanate
1-Buty-3-methylimidazolium trifluoromethanesulfonate
1-Buty-3-methylimidazolium triiodide
1-Buty-3-methylimidazolium tris(pentafluoroethyl) trifluorophosphate
1-Buty-3-methylimidazolium bis(trifluoromethylsulfonayl)imide
1-Decyl-3-methylimidazolium chloride
1-Dodecyl-3-methylimidazolium chloride
1-Ethyl-1-methylpiperidinium methylcarbonate
1-Ethyl-2,3-dimethylimidazolium bis(pentafluoroethylsulfonyl)imide
1-Ethyl-2,3-dimethylimidazolium bromide
1-Ethyl-2,3-dimethylimidazolium chloride
1-Ethyl-2,3-dimethylimidazolium ethylsulfate
1-Ethyl-2,3-dimethylimidazolium hexafluorophosphate
1-Ethyl-2,3-dimethylimidazolium methylcarbonate
1-Ethyl-3-methyl-1H-imidazolium tetrafluoroborate
1-Ethyl-3-methylimidazolium 2(2-methoxyethoxy)ethylsulfate
1-Ethyl-3-methylimidazolium acetate
1-Ethyl-3-methylimidazolium bis(pentafluoroethylsulfonyl)imide
1-Ethyl-3-methylimidazolium bis(trifluoromethylsulfonyl)imide
1-Ethyl-3-methylimidazolium bromide
1-Ethyl-3-methylimidazolium chloride
1-Ethyl-3-methylimidazolium dibutylphosphate
1-Ethyl-3-methylimidazolium dicyanamide
1-Ethyl-3-methylimidazolium diethylphosphate
1-Ethyl-3-methylimidazolium ethylsulfate
1-Ethyl-3-methylimidazolium hexafluoroarsenate
1-Ethyl-3-methylimidazolium hydrogencarbonate
1-Ethyl-3-methylimidazolium hydrogensulfate
1-Ethyl-3-methylimidazolium iodide
1-Ethyl-3-methylimidazolium methanesulfonate
1-Ethyl-3-methylimidazolium nitrate
1-Ethyl-3-methylimidazolium nitrite
1-Ethyl-3-methylimidazolium octylsulfate
1-Ethyl-3-methylimidazolium tetrabromoaluminate(III)
1-Ethyl-3-methylimidazolium tetrachloroaluminate
1-Ethyl-3-methylimidazolium tetrachlorogallate
1-Ethyl-3-methylimidazolium tetracyanoborate
1-Ethyl-3-methylimidazolium tetrafluoroborate
1-Ethyl-3-methylimidazolium thiocyanate
1-Ethyl-3-methylimidazolium trifluoromethanesulfonate
1-Ethyl-3-methylimidazolium triiodide
1-Ethyl-3-methylimidazolium tris(pentafluoroethyl)trifluorophosphate
1-Ethyl-3-methylimidazolium tris(trifluoromethylsulfonyl)methide
1-Hexyl-1-methyl-pyrroidinium tetracyanoborate TABLE 1-continued 1-Hexyl-3-methylimidazolium bis(trifluoromethylsulfonyl)imide
1-Hexyl-3-methylimidazolium chloride
1-Hexyl-3-methylimidazolium hexafluorophosphate
1-Hexyl-3-methylimidazolium tetracyanoborate
1-Hexyl-3-methylimidazolium trifluoromethylsulfonate
1-Hexyl-3-methylimidazolium tris(pentafluoroethyl) trifluorophosphate
1-Hexyloxymethyl-3-methylimidazolium bis(trifluoromethylsulfonyl)imide
1-Hexyloxymethyl-3-methylimidazolium tetrafluoroborate
1-i-Propyl-3-methylimidazolium bis(trifluoromethylsulfonyl)imide
1-i-Propyl-3-methylimidazolium iodide
1-i-Propyl-3-methylimidazolium hexafluorophosphate
1-Methyl-3-methylimidazolium dimethylphosphate
1-Methyl-3-methylimidazolium methylsulfate
1-Methyl-3-propylimidazolium chloride
1-Methyl-4-octylpyridinium bromide
1-Methyl-4-octylpyridinium chloride
1-Methyl-4-octylpyridinium iodide
1-Methylimidazolium chloride
1-Methylimidazolium hydrogensulfate
1-n-Butyl-3-methylimidazolium bromide
1-n-Butyl-3-methylimidazolium chloride
1-n-Butyl-3-methylimidazolium hexafluorophosphate
1-n-Butyl-3-methylimidazolium tetrafluoroborate
1-n-Butyl-3-methylimidazolium trifluoromethanesulfonate
1-n-Heptyl-3-methylimidazolium hexafluorophosphate
1-n-Octyl-3-methylimidazolium hexafluorophosphate
1-n-Octyl-3-methylimidazolium tetrafluoroborate
1-n-Pentyl-3-methylimidazolium hexafluorophosphate
1-n-Propyl-2,3-methylimidazolium bis(pentafluoroethylsulfonyl)imide
1-n-Octyl-3-methylimidazolium chloride
1-n-Octyl-3-methylimidazolium trifluoromethylsulfonate
1-n-Propyl-2,3-dimethylimidazolium chloride
1-n-Propyl-2,3-dimethylimidazolium hexafluorophosphate
1-n-Propyl-3-methylimidazolium tetrachloroaluminate
1-n-Vinyl-3-methylimidazolium hydrogencarbonate
2,3 Dimethyl-1-propylimidazolium bis(trifluoromethylsulfonyl)imide
2,3 Dimethyl-1-propylimidazolium iodide
2,3-Dimethyl-1-n-propylimidazolium bis(trifluoromethylsulfonyl)imide
2,4,5-Trimethylimidazolium chloride
2-Hydroxyethyltrimethtlammonium acetate
2-Hydroxyethyltrimethtlammonium dimethylphosphate
3-Methyl-1-propylimidazolium bis(trifluoromethylsulfonyl)imide
3-Methyl-1-propylimidazolium iodide
3-Methyl-1-propylpyridinium bis(trifluoromethylsulfonyl)imide
4-Ethyl-4-methylmorpholinium methylcarbonate
4-Methyl-N-butylpyridinium tetrafluoroborate
Ethyl-3-methylimidazolium tris(pentafluoroethyl) trifluorophosphate
Ethyldimethyl-(2-methoxyethyl)ammonium tris(pentafluoroethyl)trifluorophosphate
Ethyl-dimethyl-propylammonium bis(trifluoromethylsulfonyl)imide
Methyltrioctylammonium thiosalicylate
N-(Methoxyethyl)-1-methylpyrrolidinium bis(trifluoromethylsulfonyl)imide
N,N-Dimethylpyrrolidinium bis(trifluoromethylsulfonyl)imide
N,N-Dimethylpyrrolidinium iodide
N-Butyl-1-methylpyrrolidinium bis(trifluoromethylsulfonyl)imide
N-Butyl-1-methylpyrrolidinium bis[oxalate(2-)-O,O-]borate
N-Butyl-1-methylpyrrolidinium bromide
N-Butyl-1-methylpyrrolidinium chloride
N-Butyl-1-methylpyrrolidinium dicyanamide
N-Butyl-1-methylpyrrolidinium trifluoromethanesulfonate
N-Butyl-1-methylpyrrolidinium tris(pentafluoroethyl)trifluorophosphate
N-Butyl-4-(N',N'-dimethylammonium)pyridinium bis(trifluoromethylsulfonyl)imide
N-Butylpyridinium chloride
N-Butylpyridinium tetrafluoroborate
N-Ethyl-3-methylpyridinium ethylsulfate
N-Ethyl-3-methylpyridinium perfluorobutanesulfonate
N-Ethyl-4-(N',N'-dimethylammonium)pyridinium bis(trifluoromethylsulfonyl)imide
n-Ethyl-N,N-dimethyl-2-methoxyethylammonium tris(pentafluoroethyl)trifluorophosphate
N-Ethylpyridinium bis(trifluoromethylsulfonyl)imide
N-Hexyl-4-(N',N'-dimethylammonium)pyridinium bis(trifluoromethylsulfonyl)imide
N-Methyl-N-Ethylpyrrolidium bis(trifluoromethylsulfonyl)imide
N-Methyl-N-n-propylpyrrolidinium bis(trifluoromethylsulfonyl)imide
Pentamethylimidazolium bis(trifluoromethylsulfonyl)imide
Pentamethylimidazolium hexafluorophosphate
Pentamethylimidazolium iodide TABLE 1-continued Pyridinium ethoxyethylsulfate
Tetrabutylammonium chloride
Tetraethylammonium bis(pentafluoroethylsulfonyl)imide
Tetraethylammonium bis(trifluoromethylsulfonyl)imide
Tetraethylammonium hexafluorophosphate
Tetraethylammonium tetrafluoroborate
Tetraethylammonium tris(trifluoromethylsulfonyl)methide
Tetrahexylammonium perchlorate
Tetra-iso-pentylammonium iodide
Tetramethylammonium tris(pentafluoroethyl)trifluorophosphate
Tetra-N-butylammonium 4-toluenesulfonate
Tetra-N-butylammonium benzenesulonate
Tetra-n-butylammonium bis(trifluoromethylsulfonyl)imide
Tetra-N-butylammonium bromide
Tetra-N-butylammonium butanesulfonate
Tetra-N-butylammonium ethanesulfonate
Tetra-N-butylammonium methanesulfonate
Tetra-N-butylammonium nitrate
Tetra-N-butylammonium nitrite
Tetra-N-butylammonium octanesulfonate
Tetra-N-butylammonium pentacyanopropenide
Tetra-N-butylammonium pentafluorobenzenesulfonate
Tetra-N-butylammonium perfluorobutanesulfonate
Tetra-N-butylammonium perfluorooctanesulfonate
Tetra-N-butylammonium picrate
Tetra-N-butylammonium sulfamate
Tetra-N-butylammonium tetra-N-butylborate
Tetra-N-butylammonium thiocyanate
Tetra-N-butylammonium trifluoromethanesulfonate
Tetra-n-butylammonium tris(trifluoromethylsulfonyl)methide
Tetra-N-butylammonium iodide
Tetra-N-heptylammonium iodide
Tetra-N-hexylammonium bromide
Tetra-N-hexylammonium iodide
Tetra-N-hexylammonium tetrafluoroborate
Tetra-N-pentylammonium iodide
Tetra-N-pentylammonium nitrate
Tetra-N-pentylammonium thiocyanate
Tetrapentylammonium bromide
Tributylmethylammonium methylcarbonate
Tributylmethylammonium methylsulfate
Tributylmethylphosphonium dibutylphosphate
Tributylmethylphosphonium methylcarbonate
Triethylamine hydrochloride 2[AlCl3]
Triethylmethylammonium dibutylphosphate
Triethylmethylammonium methylcarbonate
Triethylmethylphosphonium dibutylphosphate
Tri-N-butylmethylammonium butanesulfonate
Tri-N-butylmethylammonium octanesulfonate
Tri-N-butylmethylammonium perfluorobutanesulfonate
Tri-N-butylmethylammonium perfluorooctanesulfonate
Tri-n-hexyl-n-tetradecylphosphonium chloride
Trioctylmethylammonium thiosalicylate
Tris(2-hydroxyethyl)methylammonium methylsulfate Organic Solvent Examples of the organic solvent are listed in Table 2 infra. A selection may be made with a solubility therein of the atom ion encapsulated fullerene taken into consideration.

TABLE 2

1,1,1,3,3,3-hexafuluoro-2-propanol
1,1,1-trichloroethane
1,1,2,2-tetrachloroethane
1,1,2-trichlorotrifluoroethane
1,2,3,5-tetramethylbenzene
1,2-butanediol
1,2-duichlorobenzene
1,2-dichloroethane
1,2-dimethoxybenzene (veratrole)
1,2-dimethoxyethane (monoglyme)
1,2-propanediol
1,3-butanediol
1,3-dioxolane
1,3-propanediol
1,4-butanediol
1,4-dimethylpiperazine TABLE 2-continued 1,4-dioxane
1-butanol
1-chlorobutane
1-decanol
1-heptanol
1-hexanol
1-methylnaphthalene
1-methylpiperidine
1-methylpyrrole
1-methylpyrrolidin-2-one
1-methylpyrrolidine
1-nonanol
1-octanol
1-pentanol
1-propanol
1-undecanol
2,2,2-trichloroethanol
2,2,2-trifluoroethanol
2,2,3,3-tetrafluoro-1-propanol
2,2,3,4,4,4-hexafluoro-1-butanol
2,2,4-trimethylpentane
2,3-butanediol
2,4,6-trimethylpyridine
2,6-dimethylpyridine
2-butanol
2-butanone
2-butoxyethanol
2-chloroethanol
2-hexanol
2-methoxyethanol
2-methoxyethyl ether (diglyme)
2-methyl-1,3-propanediol
2-methyl-1-butanol
2-methyl-1-pentanol
2-methyl-1-propanol
2-methyl-2-butanol
2-methyl-2-propanol
2-methylbutane
2-methylbutyric acid
2-methylfuran
2-methylpyridine
2-methyltetrahydrofuran
2-octanol
2-pentanol
2-pentanone
2-phenylethanol
2-propanol
2-pyrrolidinone
3,5,5-trimethyl-2-cyclohexenone (isophorone)
3-hexanol
3-methyl-1-butanol
3-methyl-2-butanol
3-pentanol
3-pentanone
4-methyl-2-pentanone
acetic acid
acetone
acetonitrile
acetophenone
allyl alcohol (2-propenol)
anisole (methyl phenyl ether)
benzene
benzonitrile
benzyl alcohol
bromobenzene
butyronitrile
carbon disulfide
chloroacetonitrile
chlorobenzene
chloroform
cineole
cis-decaline
cycloheptane
cycloheptanol
cyclohexane
cyclohexanol
cyclohexanone
cyclohexylamine
cyclooctane
cyclooctanol
cyclopentane
cyclopentanol
cyclopentanone
decaline
decane
dibenzyl ether
dichloroacetic acid
dichloromethane
diethyl ether
diisopropyl ether
dimethoxymethane
dimethyl carbonate
dimethyl sulfite
dimethyl sulfoxide
di-n-butyl ether
di-n-butyl oxalate
di-n-butylamine
di-n-hexyl ether
di-n-penthyl ether
di-n-propyl ether
dodecane
ethanol
ethyl 2-methyl acetate
ethyl acetate
ethyl benzoate
ethyl salicylate
ethylbenzene
ethylcyclohexane
ethylene glycol (1,2-ethanediol)
ethylenediamine
ethylphenyl ether
fluorobenzene
formamide
formic acid
furan
gas
g-butyrolactane
glycerol (1,2,3-propanetriol)
heptane
heptanoic acid
hexadecane
hexafluorobenzene
hexane
hexanoic acid
HMPA (hexamethylphosphoric acid triamide)
iodobenzene
iodoethane
isoamyl acetate
isobutyric acid
isobutyronitrile
isovaleric acid
m-cresol
mesitylene
methanol
methyl acetate
methyl benzoate
methyl formate
methyl salicylate
methyl cyclohexane
methylene chloride
morpholine
m-xylene
N,N¯-dimethylpropyleneurea
N,N-diethylacetamide
N,N-diethylformamide
N,N-dimethylacetamide
N,N-dimethylaniline
N,N-dimethylcyclohexylamide
N,N-dimethylformamide
n-butyl acetate
n-butyl methyl amine
n-butyl methyl ether
n-butyl amine
n-butyl benzene
n-butyl cyclohexane
n-butyric acid
nitrobenzene
nitroethane
nitromethane
N-methylacetamide TABLE 2-continued N-methylaniline
N-methylcyclohexylamine
N-methylformamide
N-methylimidazole
nonane
nonanoic acid
n-propyl acetate
n-propyl formate
n-propyl benzene
n-propyl cyclohexane
octane
octanoic acid
o-xylene
pentadecane
pentafluoropropionic acid
pentane
perfluorohexane
perfluoropyridine
petroleum ether
piperidine
propargyl alcohol (2-propynol)
propionic acid
propionitrile
propiophenone
propylene carbonate
p-xylene
pyridine
pyrrole
pyrrolidine
sulfolane
tert-butyl methyl ether
tert-butylbenzene
tert-butylcyclohexane
tetrachloromethane
tetrahydrofuran
tetrahydropyran
tetrahydrothiophene
tetraline
tetramethylguanidine
tetramethylurea
thioanisole
toluene
triacetin
trichloroethene
triethyl phosphate
triethyl phosphite
triethylamine
trifluoroacetic acid
trifluoro-m-cresol
trifluoromethylbenzene
trimethyl orthoformate
trimethyl phosphate
trimethyl phosphite
trimethylacetic acid
tri-n-butylamine
tri-n-propylamine
undecane
valeric acid
valeronitrile Preparation of Liquid Electrolyte An atom ion encapsulated fullerene or a salt comprising an atom ion encapsulated fullerene may be dissolved in an ionic liquid by taking a required amount of the ionic liquid in a container containing a weighed amount of the atom ion encapsulated fullerene or the salt comprising the atom ion encapsulated fullerene, followed by agitating them.

For agitation, use may be made of an ultrasonic cleaner or stirrer.

Where the dissolution of the atom ion encapsulated fullerene or the salt comprising the atom ion encapsulated fullerene in the ionic liquid is to proceed slowly, the atom ion encapsulated fullerene or the salt comprising the atom ion encapsulated fullerene and the ionic liquid may be raised in temperature.

A residue where it remains undissolved in the ionic liquid is precipitated by a centrifugal separator. A liquid that is separated from a solid portion precipitated may be filtrated. The liquid filtrated is used as a liquid electrolyte making an electric double-layer capacitor.

Basic Structure of Capacitor

Electric Double-Layer Capacitor of Solution Type

Figure 1:
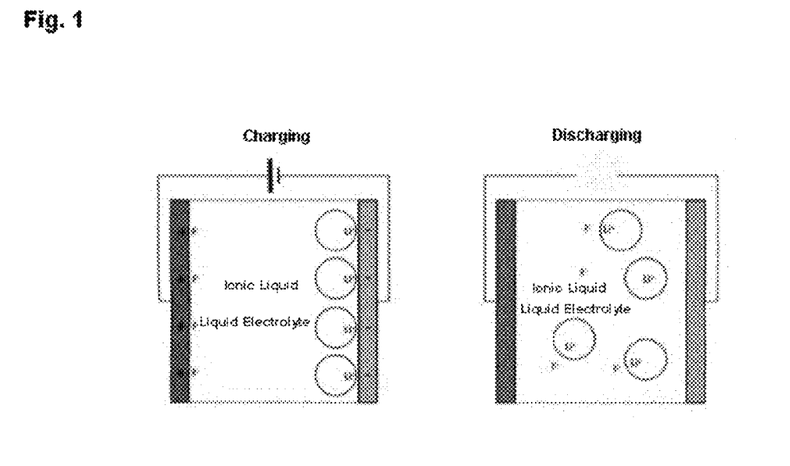
FIG. 1 is a conceptual diagram illustrating a basic structure of an electric double-layer capacitor.

FIG. 1 shows the basic structure of an electric double-layer capacitor of liquid solution type.

In an embodiment of the invention shown in FIG. 1, lithium encapsulated fullerene is incorporated in an ionic liquid. It is a structure that a liquid electrolyte containing the lithium encapsulated fullerene in the ionic liquid is held between a pair of electrodes. To constitute such an electrode, use may be made of gold, silver, copper, platinum, black lead, graphite, stainless steel, aluminum or the like.

The electrode used may be of flat plate, or porous. Being porous is preferred in order to increase the electrode surface area.

It should be noted that the electrodes are mounted so that they may not be in contact with each other. In order to prepare the electrodes so that they are narrowly spaced apart, the electrodes may have a separator interposed between them and which is electrically insulating and permeable to the liquid electrolyte. A space between the electrodes is filled with the liquid electrolyte.

The body of a cell receiving and filled with the liquid electrolyte may be composed of a material that is electrically insulating and not affected by the liquid electrolyte.

Also, the cell is filled with the liquid electrolyte, preferably in an atmosphere exclusive of oxygen and water vapor and not deteriorating the liquid electrolyte and the electrodes. Such an atmosphere can be used including nitrogen and argon atmospheres.

Connecting the electrodes to a power supply to start charging causes anions (F ions as shown) and cations (of lithium encapsulated fullerene as shown) to be attracted towards positive holes and electrons, respectively, whereby a layer of holes and F ions and a layer of electrons and ions of lithium encapsulated fullerene are oriented and spaced at the minimum distance, forming an electric double layer (the left hand side view of FIG. 1). This state is maintained if the power supply is disconnected.

The left [right] hand side view of FIG. 1 shows the state that a load is connected to which charges are discharged. Electrons return to the positive electrode or anode, and holes disappear. Cations (of lithium encapsulated fullerene) and anions (F ions) are diffused into the liquid solution, accordingly.

In this process, lithium ions are protected in the shell of fullerene, permitting higher capacitance and stability, and storage of electricity under higher breakdown strength, to be realized. To wit, an electricity storing system is achieved having high energy density and stability that should eradicate drawbacks of a conventional lithium ion rechargeable battery.

Also, in the conventional lithium ion rechargeable battery, lithium ions in the liquid electrolyte are solvated, behaving as large masses in effect and thus moving slowly. In contrast, the shell of a fullerene hinders lithium ions from solvation. And, being of spherical symmetry, the fullerene is rapid in rate of travel, thus achieving higher charging and discharging speeds and higher power output density.

Electric Double-Layer Capacitor of Solid Type (I)

Figure 7:
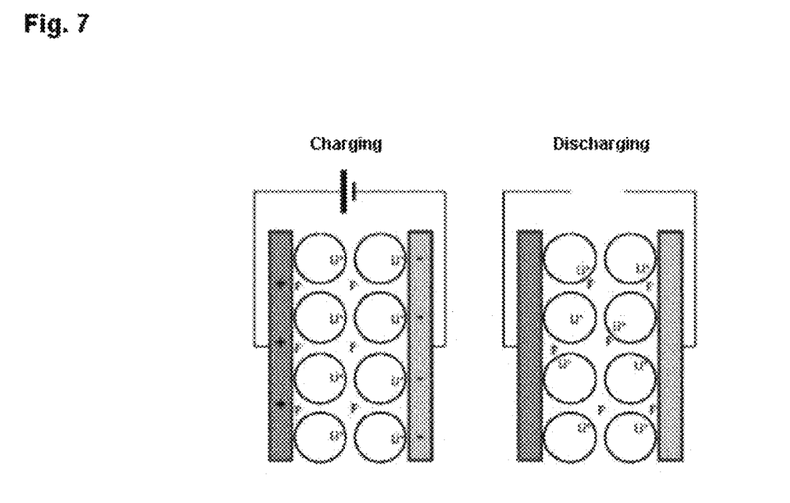
FIG. 7 is a schematic diagram illustrating a structure of an electric double-layer capacitor of solid type according to the present invention.

FIG. 7 illustrates a schematic structure of an electric double-layer capacitor of a solid type.

An atom ion encapsulated fullerene has a large dipole moment. A molecule having a large dipole moment develops a high dielectric constant. Thus, an electric double-layer capacitor as shown in FIG. 7 is enabled to be of an increased capacitance.

In an embodiment given in the Figure, there is shown [Li@C60][F] salt.

With a voltage applied that is less than a value under which a pair of [Li@C60] and [F] are separated from each other, an electric double-layer capacitor is formed which is of a structure as shown in FIG. 7.

Then, the electric double layer constituted of single molecular layers each on an electrode surface contributes exclusively to capacitance storage.

An electrostatic capacitance C for storage on the electric double-layer is sought from an equation infra.

$$C=(\in/4\pi\delta)\cdot S$$

where
∈: dielectric constant
δ: thickness of the electric double-layer
S: surface area of the electrode interface When a voltage is applied between the electrodes, at the minus (−) electrode side there is rotated the [Li@C60][F] salt so that L+ ions inside of the fullerene of [Li@C60][F] salt may come towards the minus (−) electrode, thus [Li@C60]+ ions thereon forming a first layer of the electric double layer.

As for at the plus (+) electrode side, there is rotated the [Li@C60][F] salt so that [F]— ions in the [Li@C60][F] salt may come towards the plus (+) electrode, thus [F]— ions thereon forming a second layer of the electric double layer.

Electric Double-Layer Capacitor of Solid Type (II)

Figure 8:
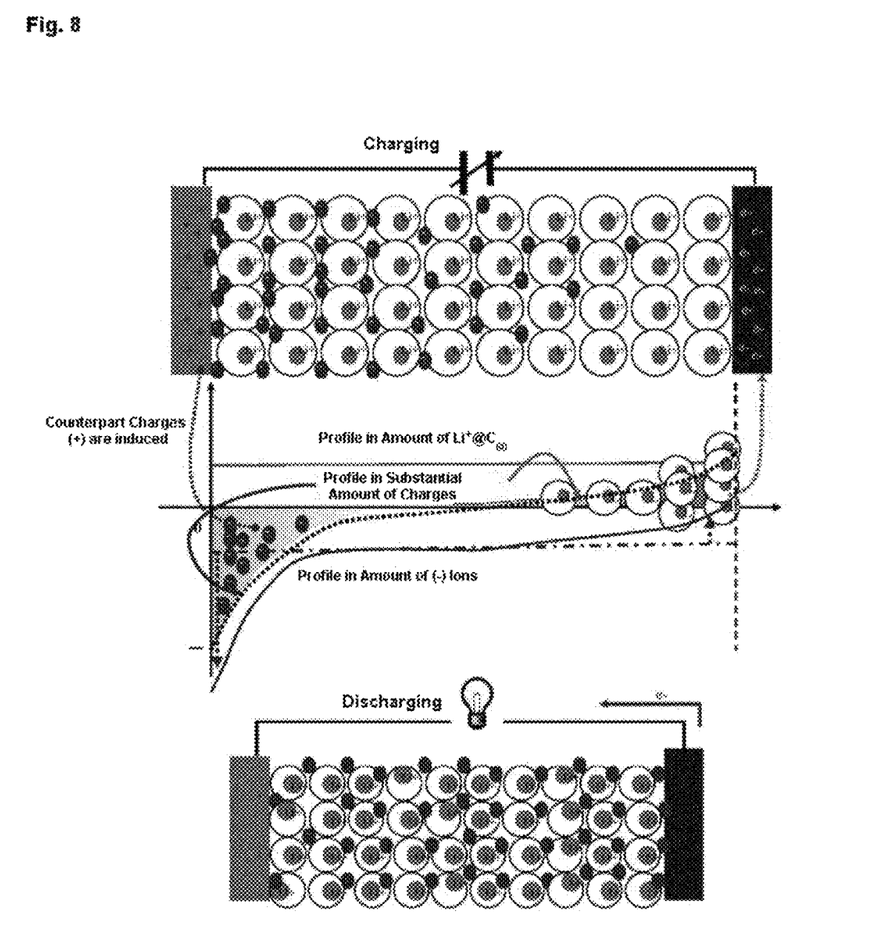
FIG. 8 a detailed schematic diagram illustrating a structure of an electric double-layer capacitor of another solid type according to the present invention.

FIG. 8 illustrates in a schematic detail the structure of an electric double-layer capacitor of another solid type.

This embodiment, in which an atom ion encapsulated fullerene salt is formed as a crystal, is constructed to hold the formed crystal between the electrodes.

In this embodiment, the atom ion encapsulated fullerene is formed as a crystal. Thus, even under a high voltage sufficient to cause a pair of an anion and a cation to be separated from each other, atom ion encapsulated fullerene cations (e.g. [Li@C60]+) are static and not movable.

Being of a perfect solid cell structure filled up with lithium encapsulated fullerene cations (positive ions) and which is stable both mechanically and chemically, an electric double-layer capacitor is realized having a high dielectric strength and a high energy density.

With positive ions immobile and with only negative ions movable, the cell interior has a concentration distribution developed and an internal electric field generated therein. Accordingly, faster ion diffusion (lower inner electric resistance) is achieved to implement an electric double-layer capacitor of higher energy density.

Further, negative ions movable freely in a large space of 1 nm formed by a fullerene makes it possible for the capacitor to charge at a high charging rate.

Specific Embodiment of the Invention

Mention is made infra of a specific embodiment of the present invention.

In the specific embodiment to be shown, the liquid electrolyte is used which is composed of 1-Butyl-3-methylimidazolium methyl sulfate having Li@C60.PF6 dissolved therein.

Figure 6:
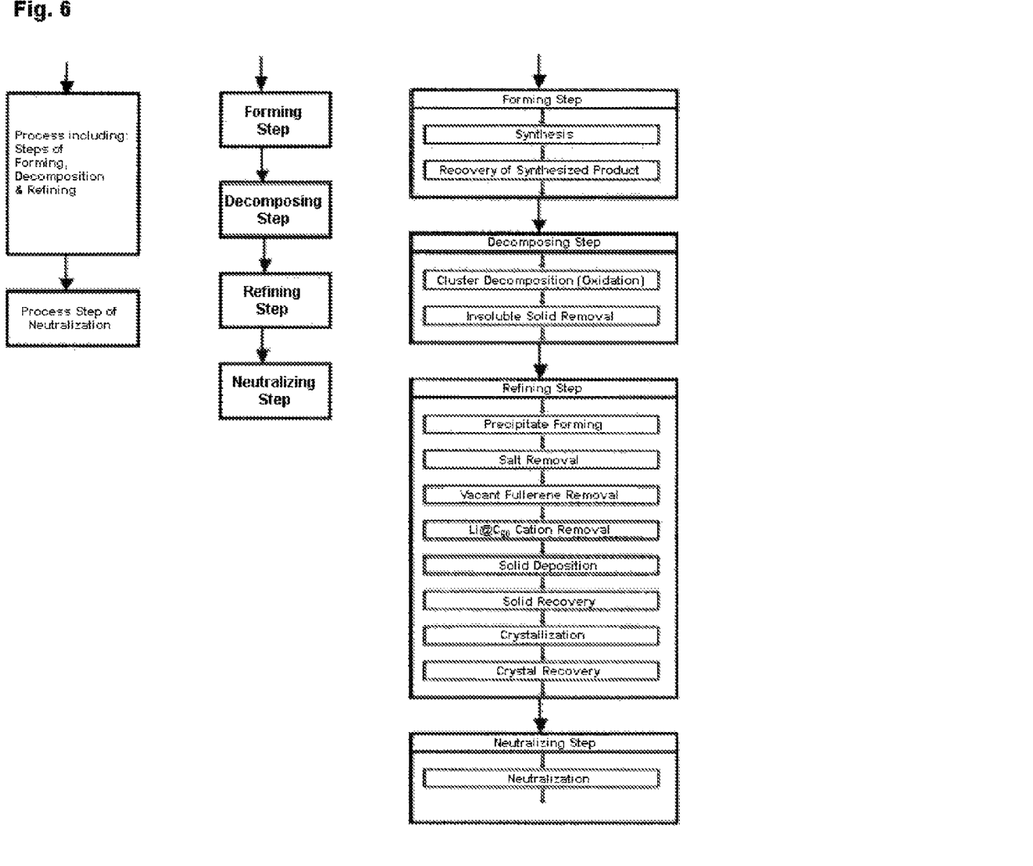
FIG. 6 is a chart of a process of isolating an atom ion encapsulated fullerene synthesized.

Li@C60.PF6 used is synthesized by a method as described in Patent Document 2 and then refined by a process shown in FIG. 6.

The electrodes use porous electrodes having a size of Φ 13 mm and composed of silver, the porous electrodes being impregnated with the liquid electrolyte.

Figure 2:
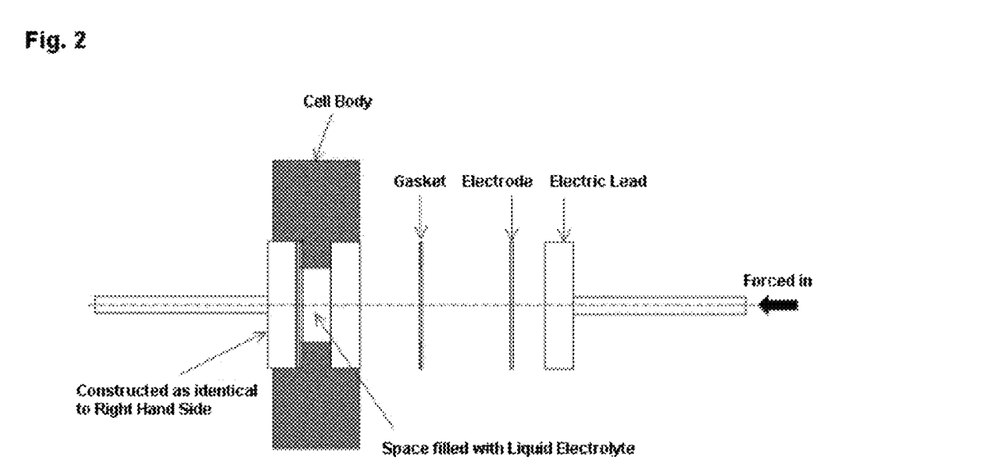
FIG. 2 is a conceptual diagram illustrating an experimental cell of electric double-layer capacitor as used in a specific embodiment of the invention.

In the embodiment, an electric double-layer capacitor is prepared having a structure as shown in FIG. 2. More specifically, a cell body is prepared which centrally has a space filled with the liquid electrolyte and which is formed across the space with a pair of recesses of a diameter larger than that of the space, the recesses as shown at the right and left hand sides of the space, respectively. In the space centrally of the cell body there is received the electrolyte composed as aforesaid of 1-Butyl-3-methylimidazolium methyl sulfate having Li@C60.PF6 dissolved therein. Each of the right and left hand side recesses thus across the electrolyte has an electrode fitted via a gasket therein and further has an electric lead forced into the recess and in contact with the electrode, thereby forming the electric double-layer capacitor.

It should be noted further that the cell body is used which is composed of a material that is electrically insulating and not affected by the liquid electrolyte. Also, the cell is assembled and filled with the liquid electrolyte under an atmosphere excluding oxygen and water vapor and that may not deteriorate the liquid electrolyte or the electrodes, e.g. under an argon atmosphere.

Figure 3:
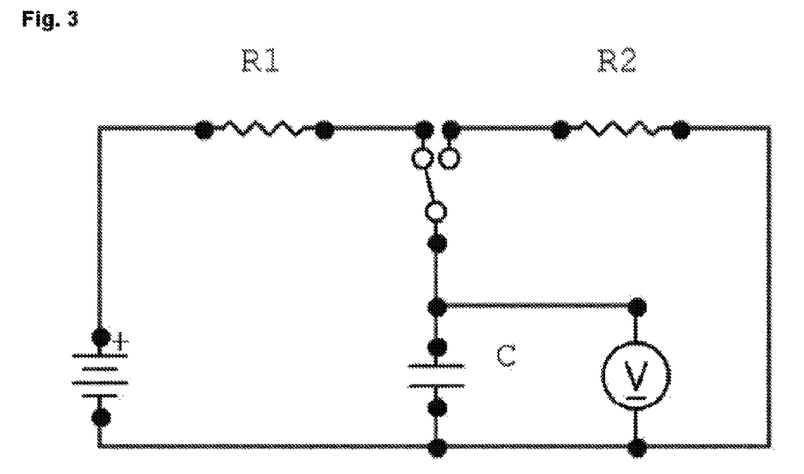
FIG. 3 is a circuit diagram of an electric circuit for measuring discharge characteristics of the electric double-layer capacitor used in the specific embodiment of the invention.

To measure an electrostatic capacitance of the electric double-layer capacitor, discharge characteristics of the capacitor are measured. In the measurement, use is made of an electric circuit as shown in FIG. 3.

A resistor R1 (235Ω) is connected in series to the electric double-layer capacitor C and the two electric leads taken out of the electrodes, and a voltage (0.39 v) is applied from a DC power supply via the resistor R1 to the two leads for the capacitor C to charge the electric double-layer capacitor C.

While the electric double-layer capacitor C is being charged, a change in the voltage between the electric leads for the electric double-layer capacitor is measured with a voltmeter connected in parallel to the electric double-layer capacitor C.

The charging resistor R1 is removed from the charged electric double-layer capacitor C, a discharging resistor (100 kΩ) is connected to the two electric leads for the electric double-layer capacitor C, and the electric double-layer capacitor C is discharged through the discharging resistor R2. While the electric double-layer capacitor C is being discharged, a change in the voltage between the two electric leads is measured with a voltmeter connected in parallel to the electric double-layer capacitor C.

Figure 4:
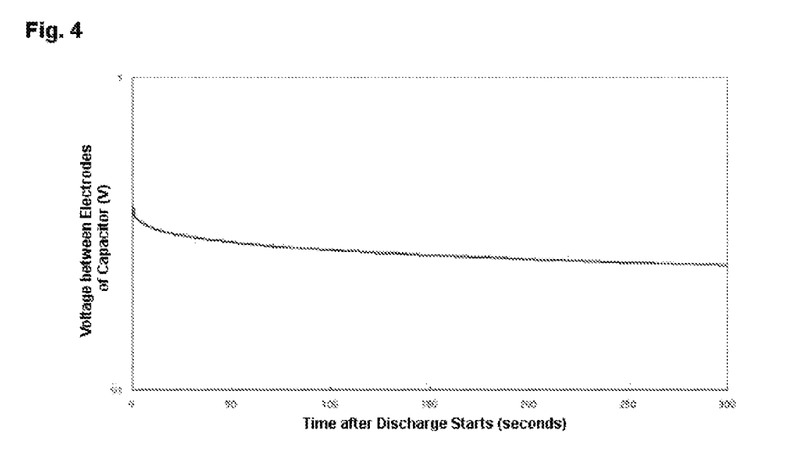
FIG. 4 is a graph exhibiting discharge characteristics of an electric double-layer capacitor as used in the embodiment of the invention.

Results of the measurement of the changing voltage between the electrodes while the capacitor is being discharged are exhibited as a graph shown in a FIG. 4.

Figure 5:
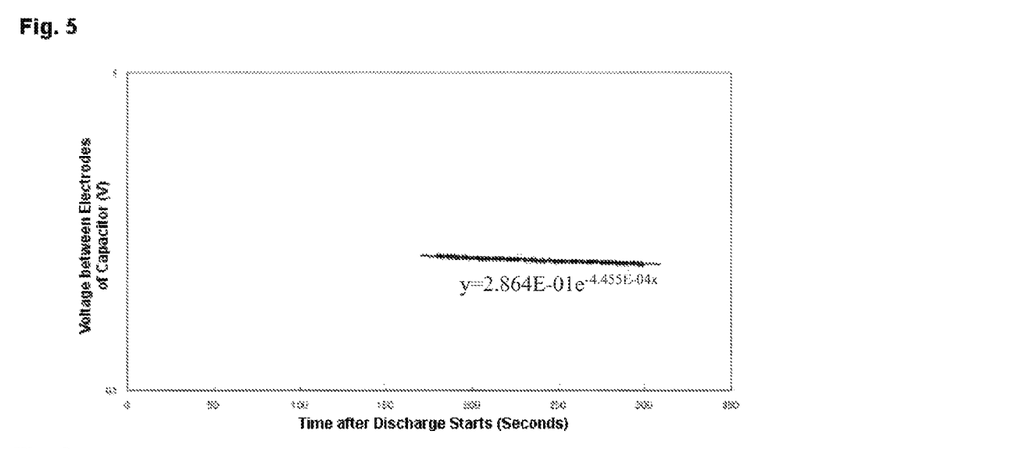
FIG. 5 is a graph indicating an approximate expression of the discharge characteristics of the electric double-layer capacitor used in the embodiment of the invention.

From a gradient of the graph of FIG. 4 where it becomes constant, a time constant is computed of an electric circuit which comprises the prepared electric double-layer capacitor and the load resistance used for discharging. FIG. 5 shows a straight line approximated with an exponential function in a time interval between 80 seconds and 300 seconds cut out of the graph of FIG. 4.

From the exponential function used to approximate the curve, it is found that the graph has a gradient of $-4.5\times10^{-4}$ s−1. Being an inverse of the value made by the gradient of the graph multiplied by −1, the time constant of the electric circuit used for discharging is computed to be $1/(4.5\times10^{-4})$ (s−1). Further, a capacitance of the electric double-layer capacitor is obtained by dividing the time constant by the resistance value of 100 kΩ, the capacitance computed being found to be 2.2×103 (s)÷1.00×105 (Ω)=2.2×10−2 (F)=2.2× 104 (μF).

For comparison purposes, an electric double-layer capacitor is prepared likewise using the identical cell in which the ionic liquid alone is contained to constitute a comparative example. Discharge characteristics are measured for the comparative example, and the capacitor is seen to possess a capacitance of 1.1×104 μF.

It has been found that an electric double-layer capacitor using as its liquid electrolyte an electrolyte having an atom ion encapsulated fullerene therein is achieved which possesses a capacitance twice as large as the capacitance possessed by that using as its liquid electrolyte the electrolyte with no such fullerene dissolved therein.

The electric double-layer capacitors in the specific embodiment and the comparative example are charged each under a fixed voltage of 5 volts for a given time period and are compared with each other in respect of an initial valve of electrostatic capacitance. It has been found that capacitance maintenance in the specific embodiment is superior to that in the comparative example.

An electric double-layer capacitor according to the present invention is high in dielectric withstanding voltage, superior in durability and large in electrostatic capacitance and hence can excellently be used not only, surely, for applications of a backup power supply for memories in a personal computer or a portable terminal and a power supply for instantaneous power failure measure in a personal computer or the like, but also for various applications in a variety of industrial fields including those in an electric car, a hybrid automobile, a large car and a solar generator energy storage system applied in combination with a solar cell.

What is claimed is:

1. An electrolyte for an electric double-layer capacitor, wherein the electrolyte contains an atom ion encapsulated fullerene therein.

* * * * *